United States Patent
Lee et al.

(10) Patent No.: US 8,817,872 B2
(45) Date of Patent: Aug. 26, 2014

(54) METHOD AND APPARATUS FOR ENCODING/DECODING MULTI-LAYER VIDEO USING WEIGHTED PREDICTION

(75) Inventors: Kyo-hyuk Lee, Seoul (KR); Sang-chang Cha, Hwaseong-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1890 days.

(21) Appl. No.: 11/410,959

(22) Filed: Apr. 26, 2006

(65) Prior Publication Data
US 2006/0245498 A1 Nov. 2, 2006

Related U.S. Application Data

(60) Provisional application No. 60/676,314, filed on May 2, 2005.

(30) Foreign Application Priority Data

Jul. 4, 2005 (KR) ........................ 10-2005-0059834

(51) Int. Cl.
*H04N 7/12* (2006.01)
*H04N 11/02* (2006.01)
*H04N 11/04* (2006.01)
*H04N 7/36* (2006.01)
*H04N 7/26* (2006.01)

(52) U.S. Cl.
CPC ..... *H04N 19/00696* (2013.01); *H04N 7/26872* (2013.01)
USPC ..................................... 375/240.12

(58) Field of Classification Search
CPC .......... H04N 7/26361; H04N 7/26872; H04N 19/00424; H04N 19/00696
USPC ...................................... 375/240.12
See application file for complete search history.

(56) References Cited

U.S. PATENT DOCUMENTS

| 5,742,343 | A | 4/1998 | Haskell et al. |
| 5,963,257 | A | 10/1999 | Katata et al. |
| 5,986,708 | A | 11/1999 | Katata et al. |

(Continued)

FOREIGN PATENT DOCUMENTS

| EP | 0644695 A3 | 10/1995 |
| EP | 0753970 A2 | 1/1997 |

(Continued)

OTHER PUBLICATIONS

Seung Hwan Kim; Yong Kwan Kim; Sang-Uk Lee, "Adaptive multiple reference frame based scalable video coding algorithm," Image Processing. 2002. Proceedings. 2002 International Conference on , vol. 2, no., pp. II-33,II-36 vol. 2, 2002.*

(Continued)

*Primary Examiner* — Jeremaiah C Hallenbeck-Huber
(74) *Attorney, Agent, or Firm* — Sughrue Mion, PLLC

(57) ABSTRACT

A method and apparatus effectively encode multiple layers using interlayer information in a multi-layered video codec. The method includes reading information concerning the low layer picture, calculating weighting factors using the information concerning the low layer picture, calculating a weighted sum of reference pictures for the current picture using the weighting factors and generating a predicted picture for the current picture, and encoding a difference between the current picture and the predicted picture.

20 Claims, 12 Drawing Sheets

(56) References Cited

U.S. PATENT DOCUMENTS

| | | |
|---|---|---|
| 6,023,299 A | 2/2000 | Katata et al. |
| 6,023,301 A | 2/2000 | Katata et al. |
| 6,084,914 A | 7/2000 | Katata et al. |
| 6,088,061 A | 7/2000 | Katata et al. |
| 6,788,740 B1 | 9/2004 | Van Der Schaar et al. |
| 6,792,044 B2 | 9/2004 | Peng et al. |
| 2002/0118742 A1* | 8/2002 | Puri et al. .................... 375/240.1 |
| 2004/0008782 A1* | 1/2004 | Boyce et al. ............. 375/240.16 |
| 2006/0083308 A1* | 4/2006 | Schwarz et al. ......... 375/240.16 |

FOREIGN PATENT DOCUMENTS

| | | |
|---|---|---|
| EP | 0961496 A2 | 12/1999 |
| EP | 0961497 A2 | 12/1999 |
| EP | 0961498 A2 | 12/1999 |
| JP | 2002-142227 A | 5/2002 |
| KR | 1995-0010644 A | 4/1995 |
| KR | 10-2001-0080644 A | 8/2001 |
| KR | 2001-0080644 A | 8/2001 |
| KR | 10-2003-0005222 A | 1/2003 |
| KR | 10-2003-0011311 A | 2/2003 |
| WO | WO 01/26381 A1 | 4/2001 |
| WO | WO 03/094526 A2 | 11/2003 |
| WO | WO 2005/011285 A1 | 2/2005 |

OTHER PUBLICATIONS

Communication dated Dec. 14, 2012 issued by the European Patent Office in counterpart European Patent Application No. 06747383.5.
Lee, et al., "Virtual Base-Layer Motion for Scalable Video Coding", Int. Organization for Standardization Organisation Internationale Normalisation, ISO/IEC JTC 1/SC 29/WG 11 Coding of Moving Pictures and Audio, Jan. 2005, pp. 1-13.
Lu, et al., "Adaptive Frame Prediction for Foveation Scalable Video Coding", 2001 IEEE Int. Conference on Multimedia Expo., Aug. 22, 2001, pp. 912-915.
Kyohyuk Lee, "Extension of weighted prediction to multi layer structure", Input Documents to JVT, Jul. 2005, pp. 1-5.

* cited by examiner

METHOD AND APPARATUS FOR ENCODING/DECODING MULTI-LAYER VIDEO USING WEIGHTED PREDICTION

CROSS-REFERENCE TO RELATED APPLICATIONS

This application claims priority from Korean Patent Application No. 10-2005-0059834 filed on Jul. 4, 2005 in the Korean Intellectual Property Office, and U.S. Provisional Patent Application No. 60/676,314 filed on May 2, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate to video coding, and more particularly, to effectively coding multiple layers using interlayer information in a multi-layered video codec.

2. Description of the Related Art

With the development of information communication technology, including the Internet, there have been an increasing number of multimedia services containing various kinds of information such as text, video, audio and so on. Multimedia data requires a large capacity of storage media and a wide bandwidth for transmission since the amount of multimedia data is usually large. For example, a 24-bit true color image having a resolution of 640*480 needs a capacity of 640*480*24 bits, i.e., data of about 7.37 Mbits, per frame. When this image is transmitted at a speed of 30 frames per second, a bandwidth of 221 Mbits/sec is required. When a 90-minute movie based on such an image is stored, a storage space of about 1200 Gbits is required. Accordingly, a compression coding method is a requisite for transmitting multimedia data including text, video, and audio.

A basic principle of data compression is removing data redundancy. Data can be compressed by removing spatial redundancy in which the same color or object is repeated in an image, temporal redundancy in which there is little change between adjacent frames in a moving image or the same sound is repeated in audio, or mental visual redundancy taking into account human eyesight and limited perception of high frequencies. Data compression can be classified into lossy/lossless compression according to whether source data is lost, intraframe/interframe compression according to whether individual frames are compressed independently, and symmetric/asymmetric compression according to whether the time required for compression is the same as the time required for recovery. Data compression is defined as real-time compression if the compression/recovery time delay does not exceed 50 ms and is defined as scalable compression when frames have different resolutions. For text or medical data, lossless compression is usually used. For multimedia data, lossy compression is usually used. Further, intraframe compression is usually used to remove spatial redundancy, and interframe compression is usually used to remove temporal redundancy.

Transmission media for transmitting multimedia information differ in performance according to the types of media transmitted. The transmission media currently in use have a variety of transfer rates, ranging, for example, from a very-high speed communication network capable of transmitting the data at a transfer rate of tens of Mbits per second to a mobile communication network having a transfer rate of 384 Kbps. Previous video coding techniques such as MPEG-1, MPEG-2, H.263 or H.264 remove redundancy based on a motion compensated prediction coding technique. Specifically, temporal redundancy is removed by motion compensation, while spatial redundancy is removed by transform coding. These techniques have a good compression rate, but do not provide flexibility for a true scalable bitstream due to the use of a recursive approach in a main algorithm. Thus, recent research has been actively made on wavelet-based scalable video coding. Scalability indicates the ability to partially decode a single compressed bitstream, that is, the ability to perform a variety of types of video reproduction. Scalability includes spatial scalability indicating a video resolution, signal-to noise ratio (SNR) scalability indicating a video quality level, temporal scalability indicating a frame rate, and a combination thereof.

Standardization of H.264 Scalable Extension (hereinafter, to be referred to be as "H.264 SE") is being performed at present by a joint video team (JVT) of the MPEG (Motion Picture Experts Group) and ITU (International Telecommunication Union). An advantageous feature of H.264 SE lies in that it exploits the relevancy among layers in order to code a plurality of layers while employing an H.264 coding technique. While the plurality of layers are different from one another in view of resolution, frame rate, SNR, or the like, they basically have a substantial similarity in that they are generated from the same video source. In this regard, a variety of efficient techniques that utilize information about lower layers in coding upper layer data are proposed.

FIG. 1 is a diagram for explaining weighted prediction proposed in conventional H.264. The weighted prediction allows a motion-compensated reference picture to be appropriately scaled instead of being averaged in order to improve prediction efficiency.

A motion block 11 (a "macroblock or "subblock" as the basic unit for calculating a motion vector) in a current picture 10 corresponds to a predetermined image 21 in a left reference picture 20 pointed by a forward motion vector 22 while corresponding to a predetermined image 31 in a right reference image 30 pointed by a backward motion vector 32.

An encoder reduces the number of bits required to represent the motion block 11 by subtracting a predicted image obtained from the images 21 and 31 from the motion block 11. A conventional encoder not using weighted prediction calculates a predicted image by simply averaging the images 21 and 31. However, since the motion block 11 is not usually identical to an average of the left and right images 21 and 31, it is difficult to obtain an accurate predicted image.

To overcome this limitation, a method for determining a predicted image using a weighted sum is proposed in H.264. According to the method, weighting factors $\alpha$ and $\beta$ are determined for each slice and a sum of products of multiplying the weighting factors $\alpha$ and $\beta$ by the images 21 and 31 are used as a predicted image. The slice may consist of a plurality of macroblocks and be identical to a picture. A plurality of slices may make up a picture. The proposed method can obtain a predicted image with a very small difference from the motion block 11 by adjusting the weighting factors. The method can also improve coding efficiency by subtracting the predicted image from the motion block 11.

While the weighted prediction defined in H.264 is very effective, this technique has been applied so far only to single layer video coding. Research has not yet been conducted on application of this technique to multi-layered scalable video coding. Accordingly, there is a need to apply weighted prediction to multi-layered scalable video coding.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. Apparatuses and methods consistent with present invention estimate a weighting factor that will be applied to a picture in a higher layer using information from a picture in a lower layer and perform weighted prediction on the picture in the higher layer using the estimated weighting factor.

These apparatuses and methods also provide a algorithm for performing the weighted prediction.

These and other aspects of the present invention will be described in or be apparent from the following description of the preferred embodiments.

According to an aspect of the present invention, there is provided a method for encoding video by performing weighted prediction on a current picture in a high layer using information on a picture in a low layer, the method including reading the information on the low layer picture, calculating weighting factors using the information on the low layer picture, calculating a weighted sum of reference pictures to the current picture using the weighting factors and generating a predicted picture for the current picture, and encoding a difference between the current picture and the predicted picture.

According to another aspect of the present invention, there is provided a method for decoding video by performing weighted prediction on a current picture in a high layer using information on a picture in a low layer, the method including extracting texture data and motion data from an input bitstream, reconstructing information about the low layer picture from the texture data, calculating weighting factors using the information on the low layer picture, calculating a weighted sum of reference pictures to the current picture using the weighting factors and generating a predicted picture for the current picture, and reconstructing a residual signal for the current picture from the texture data and adding the reconstructed residual signal to the predicted picture.

According to still another aspect of the present invention, there is provided a video encoder for performing weighted prediction on a current picture in a high layer using information on a picture in a low layer, the video encoder including an element for reading the information on the low layer picture, an element for calculating weighting factors using the information on the low layer picture, an element for calculating a weighted sum of reference pictures to the current picture using the weighting factors and generating a predicted picture for the current picture, and an element for encoding a difference between the current picture and the predicted picture.

According to yet another aspect of the present invention, there is provided a video decoder for performing weighted prediction on a current picture in a high layer using information on a picture in a low layer, the method including an element for extracting texture data and motion data from an input bitstream, an element for reconstructing information about the low layer picture from the texture data, an element for calculating weighting factors using the information on the low layer picture, an element for generating a predicted picture for the current picture by calculating a weighted sum of reference pictures to the current picture using the weighting factors, and an element for adding texture data of the current picture among the texture data to the predicted picture.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
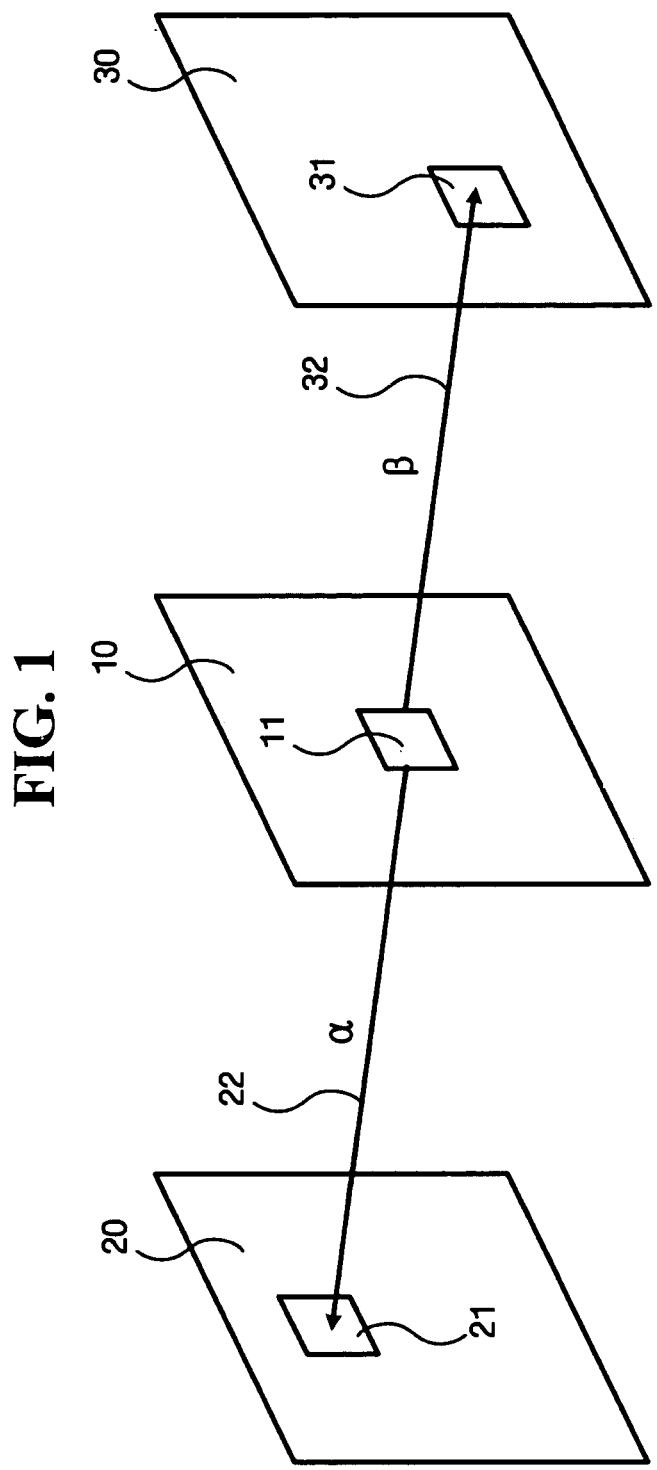
FIG. 1 is a diagram for explaining conventional weighted prediction proposed in H.264.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which embodiments of the invention are shown.

Weighted prediction can be effective for fade-in or fade-out sequences achieved by a gradual increase or decrease in brightness of a picture. When the fade-in or fade-out sequence is coded using a multi-layered scalable video codec, a weighting factor to be applied to a high layer is expected to be similar to a weighting factor for a low layer. That is, information from a picture in a low layer can be used to perform weighted prediction on a picture in a high layer. In this case, an encoder does not need to transmit weighting factors α and β needed for weighted prediction to a decoder because the information from the picture in the low layer is available at both encoder and decoder. Thus, the decoder can perform weighted prediction according to the same algorithm as used in the encoder.

Figure 2:
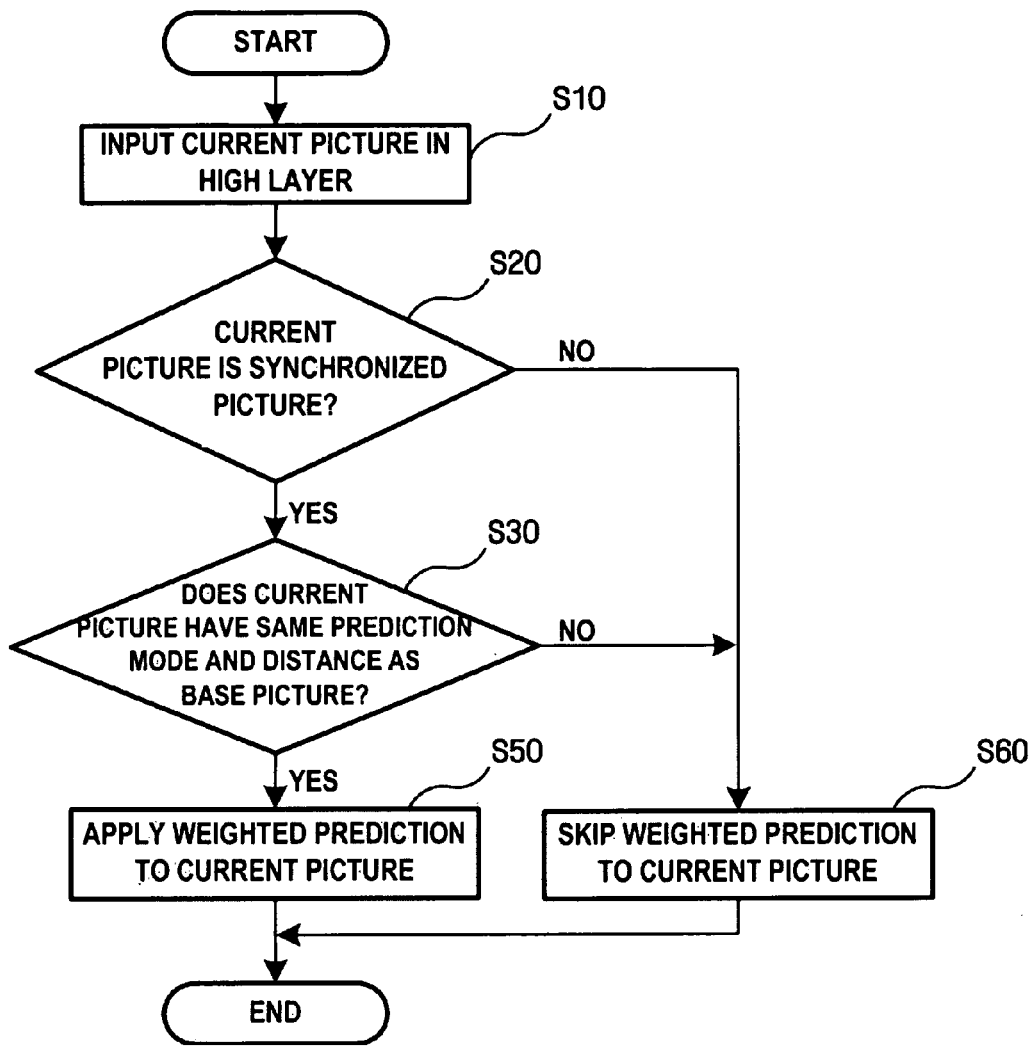
FIG. 2 is a flowchart illustrating a multi-layered weighted prediction method according to an embodiment of the present invention.

FIG. 2 is a flowchart illustrating a multi-layered weighted prediction method according to an embodiment of the present invention.

Referring to FIG. 2, if a current picture in a high layer is input in step S10, it is determined in step S20 whether the current picture is a synchronized picture. In the present invention, a synchronized picture means a picture having a corresponding picture in a lower layer (a 'base picture') at the same position. An asynchronized picture means a picture having no corresponding picture in a lower layer at the same temporal position. The temporally same position can be determined as a Picture of Count (POC) as defined as the Joint Scalable Video Model (JSVM).

If the current picture is a synchronized picture (YES in step S20), the encoder determines the current picture has the same reference scheme and reference distance as the base picture in step S30. The reference scheme may be forward reference, backward reference, bi-directional reference or other multiple reference schemes. The reference distance refers to a temporal distance between a picture being predicted and a reference picture. In the JSVM, the temporal distance can be represented as a difference between a POC for a picture being predicted and a POC for a reference picture If the current picture has the same reference scheme and reference distance as the base picture (YES in step S30), the encoder applies weighted prediction to the current picture in step S50. Conversely, if the current picture does not have different reference schemes and reference distance from the base picture (NO in step S30), the encoder does not apply weighted prediction to the current picture in step S60.

Figure 3:
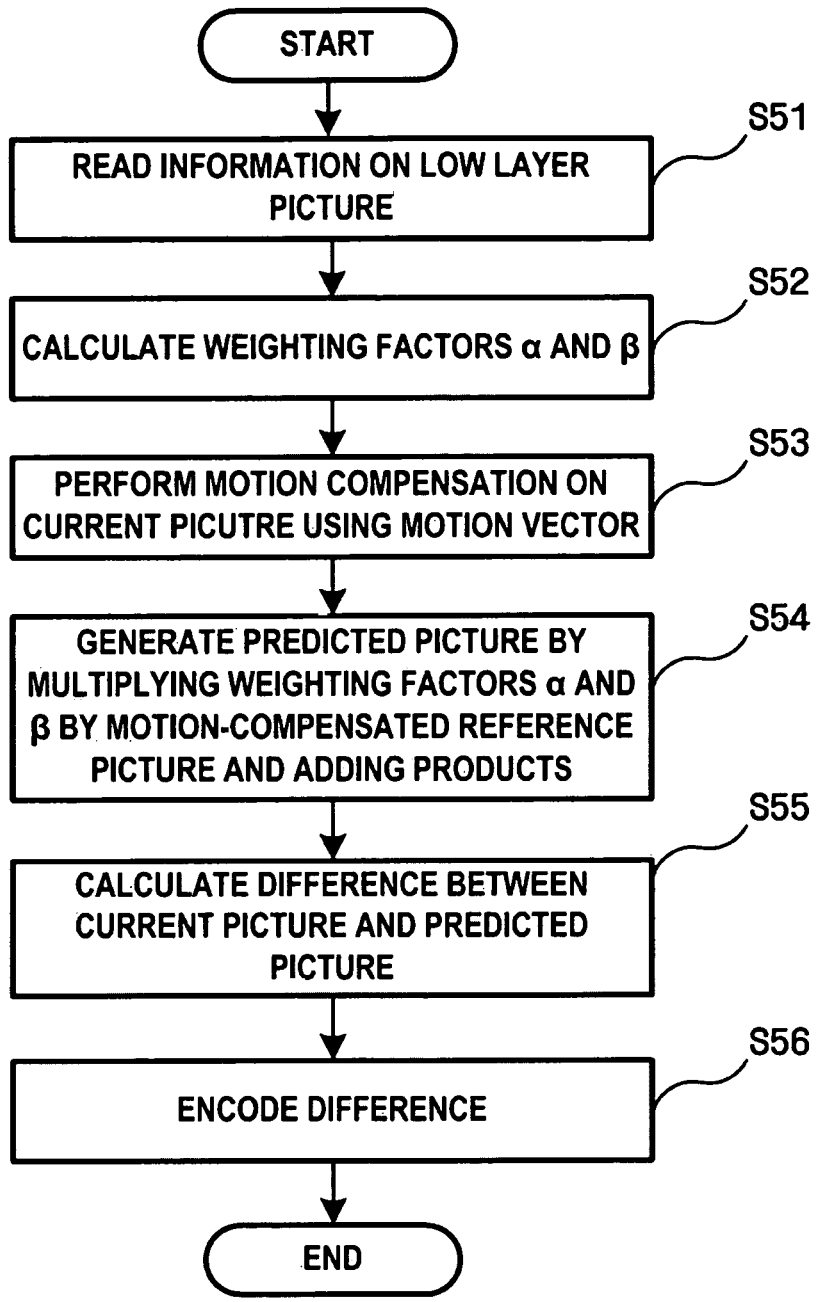
FIG. 3 is a flowchart illustrating sub-steps for step S50 illustrated in FIG. 2.

FIG. 3 is a flowchart illustrating sub-steps for the step S50 illustrated in FIG. 2. Referring to FIG. 3, in step S51, the encoder reads information on the picture in the low layer. The information on the low layer picture contains a base picture and a reference picture motion-compensated with respect to the base picture. In step S52, weighting factors α and β are calculated using the information on the low layer picture. A method for calculating the weighting factors α and β from the given pictures in step S52 (a "weighting factor calculation algorithm") will be described later in more detail.

In step S53, the encoder uses a motion vector to perform motion compensation on a reference picture to obtain the current picture. During the motion compensation, a motion vector from a high layer estimated by motion estimation is used. If a plurality of reference pictures are used, motion compensation should be performed on each of the plurality of reference pictures using an appropriate motion vector.

In step S54, the encoder multiplies weighting factors α and β by the motion-compensated reference pictures and adds the products to obtain a predicted picture (or predicted slice). The encoder calculates a difference between the current picture (or slice) and the predicted picture (or slice) in step S56 and encodes the difference in step S56.

Figure 4:
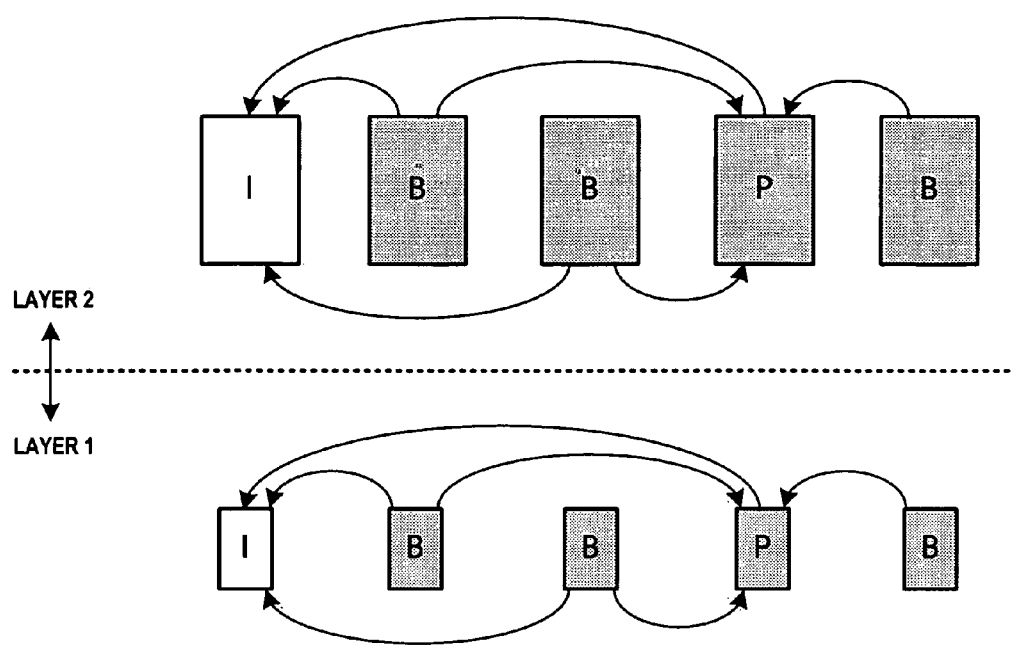
FIG. 4 illustrates a multi-layer video structure in which a high layer has double the resolution of a lower layer but the same frame rate as the low layer.

As described with reference to FIG. 3, it is not necessary to transmit to a decoder an additional flag or weighting factor needed for performing weighted prediction on a high layer. The decoder can calculate a weighting factor used in the encoder by performing weighted prediction in the same manner as the encoder FIGS. 4 through 8 are diagrams illustrating various multi-layer video structures to which the present invention can be applied. FIG. 4 illustrates a structure in which a picture in a high layer (Layer 2) has double the resolution of, but the same frame rate as, a picture in a low layer (Layer 1) and both layers have a single temporal level. Reference symbols I, P, and B denote an I-picture (or slice), a P-picture (or slice), or a B-picture (or slice), respectively.

As evident from FIG. 4, since the two layers have different resolutions but corresponding pictures in the two layers have the same reference scheme and reference distance, reference pictures in Layer 1 have the same positions as their counterparts in Layer 2. A current picture in a high layer having a base picture with the same reference scheme and reference distance can be encoded or decoded using a weighting factor applied to the base picture. Of course, when the two layers use the same reference scheme, a non-adjacent picture may be used as a reference picture.

Figure 5:
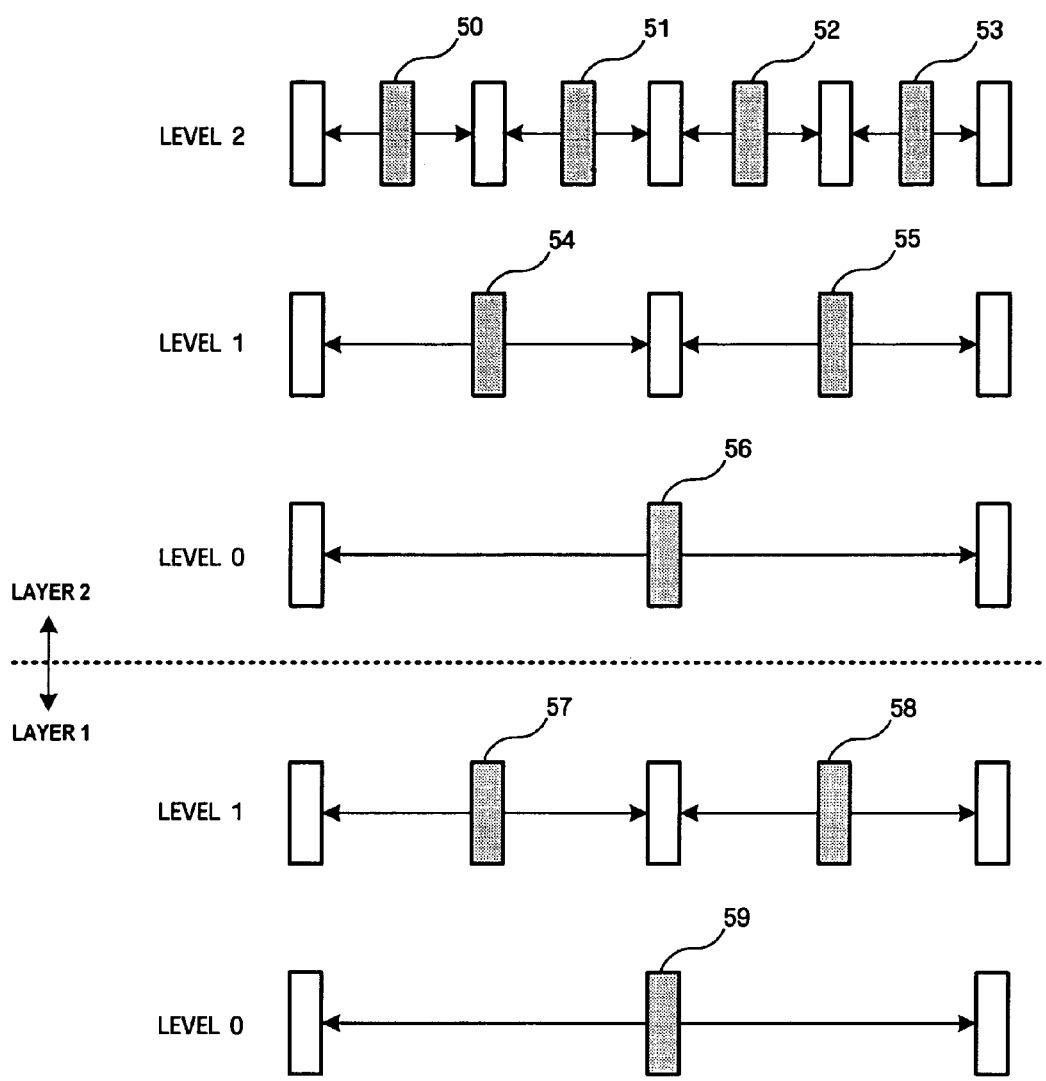
FIG. 5 illustrates a multi-layer video structure in which a high layer and a low layer have a Motion-compensated Temporal Filtering (MCTF) structure.

FIG. 5 illustrates a multi-layer video structure in which a high layer (Layer 2) has double the frame rate of a low layer (Layer 1). Referring to FIG. 5, the high layer has one more temporal level than the low layer. The techniques described here can be applied to a structure in which the high and low layers are decomposed into hierarchical temporal levels. That is, pictures 54 through 56 that satisfy the requirements described with reference to FIG. 2 among high-pass pictures in the high layer can effectively be encoded or decoded using weighting factors applied to their corresponding base pictures 57 through 59. On the other hand, weighted prediction is not applied to high-pass pictures 50 through 53 at the highest level (level 2) in the high layer with no corresponding base pictures.

Figure 6:
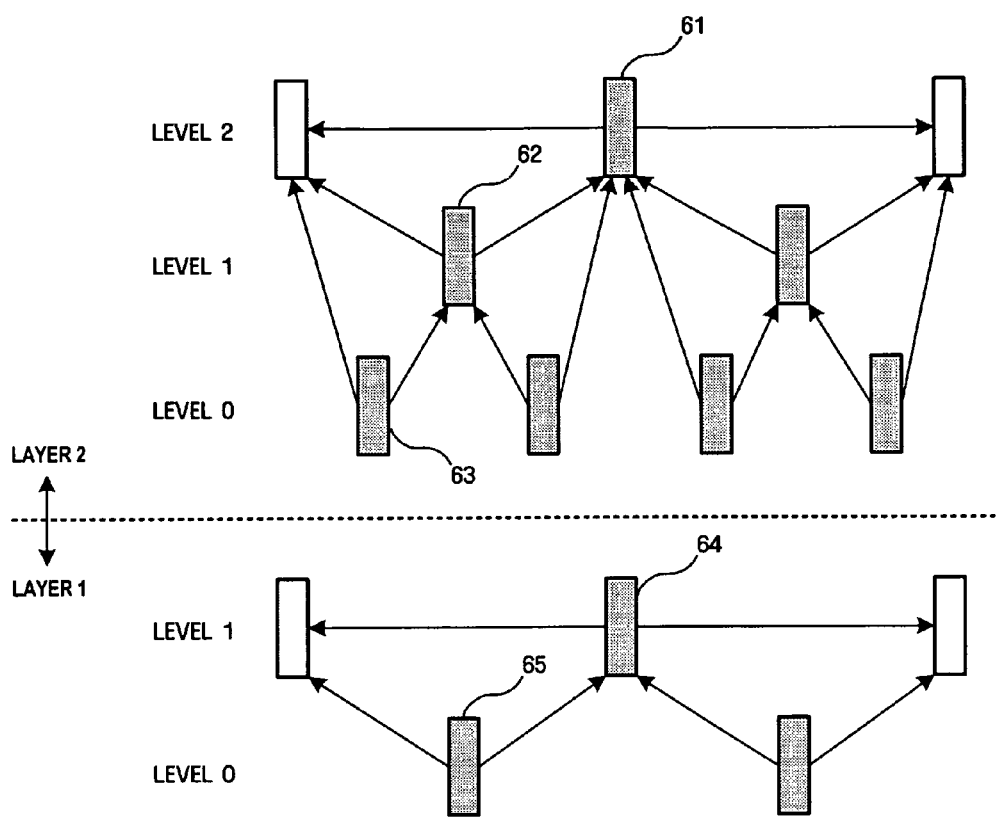
FIG. 6 illustrates a multi-layer video structure in which a high layer and a low layer have a Hierarchical B structure.

FIG. 6 illustrates a multi-layer video structure in which a high layer (Layer 2) and a low layer (Layer 1) have a hierarchical B structure defined in H.264. Like in FIG. 5, the high layer has double the frame rate of the low layer. In the Hierarchical B structure, each layer is decomposed into temporal levels in a different way than for a MCTF structure. That is, a frame rate increases in the order from high to low levels. Assuming that the frame rate of the high layer is A, when a decoder desires to decode a video with a frame rate of A/4, the encoder transmits only pictures at level 2. When the decoder desires to decode a video with a frame rate of A/2, the encoder may transmit only pictures at levels 2 and 1. When a video with a frame rate of A is desired, the encoder may transmit pictures at all levels.

Referring to FIG. 6, a high-pass picture 61 has the same reference scheme and reference distance as a base picture 64 and a high-pass picture 62 has the same reference scheme and reference distance as a base picture 65. Thus, the high-pass pictures 61 and 62 can be subjected to weighted reference using weighting factors applied to the base pictures 64 and 65. On the other hand, weighted reference is not applied to a high-pass picture 63 because it does not have a corresponding base picture.

Figure 7:
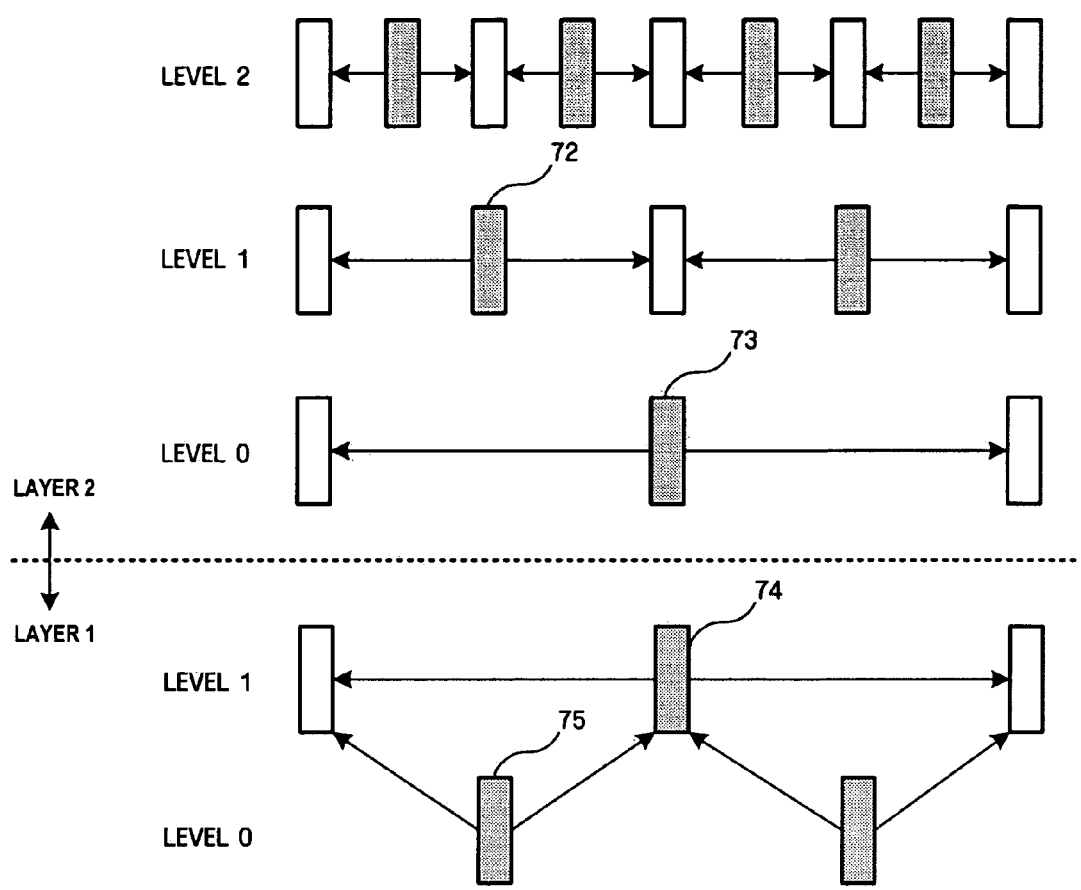
FIG. 7 illustrates a multi-layer video structure in which a high layer has a MCTF structure and a low layer has a Hierarchical B structure.

FIG. 7 illustrates a multi-layer video structure in which a high layer (Layer 2) has a MCTF structure and a low layer. (Layer 1) has a Hierarchical B structure. Referring to FIG. 7, weighted prediction is not applied to high-pass pictures at level 2 in the high layer because the high pass pictures at level 2 do not have any corresponding base pictures. On the other hand, high-pass pictures at level 1 or 0 have corresponding base pictures. For example, a high-pass picture 72 has a base picture 75. Although the high-pass picture 72 has a MCTF structure and the base picture has a Hierarchical B structure, weighted prediction can be applied without any problem if the two pictures 72 and 75 have the same reference scheme and reference distance. Because the two pictures 72 and 75 actually have the same reference scheme and reference distance, weighted prediction can be applied. Similarly, weighted prediction can be performed on a picture 73 using a weighting factor assigned to a picture 74.

Figure 8:
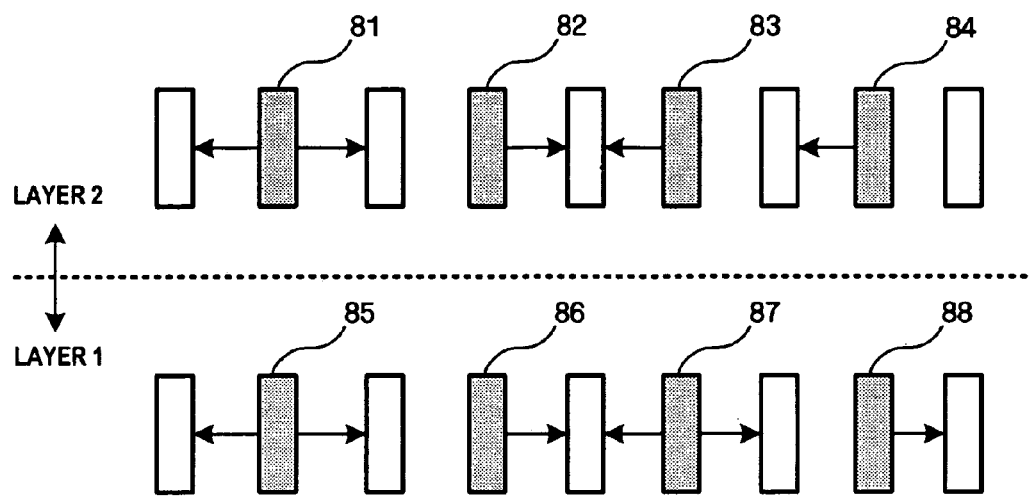
FIG. 8 illustrates a multi-layer video structure in which a high layer and a low layer have the same frame rate and pictures have multiple reference schemes.

FIG. 8 illustrates a multi-layer video structure in which a high layer (Layer 2) and a low layer (Layer 1) have a single temporal level and all high-pass pictures in the high layer have corresponding base pictures. However, all the high-pass pictures in the high layer do not have the same reference scheme and reference distance as their corresponding base pictures.

For example, a high-pass picture 81 has the same reference scheme (bi-directional reference scheme) and the same reference distance (1) as its corresponding base picture 85. A high-pass picture 82 has the same reference scheme (backward reference scheme) and the same reference distance (1) as its corresponding picture 86. Conversely, high-pass pictures 83 and 84 do not use the same reference schemes as their corresponding base pictures 87 and 88. Thus, weighted prediction is not applied to the high-pass pictures 83 and 84.

While in the above description, weighted prediction is applied when the current picture is a synchronized picture and the current picture has the same reference scheme and reference distance as the base picture, the present invention is not limited to the particular embodiments shown in FIGS. 2 through 8.

Figure 9:
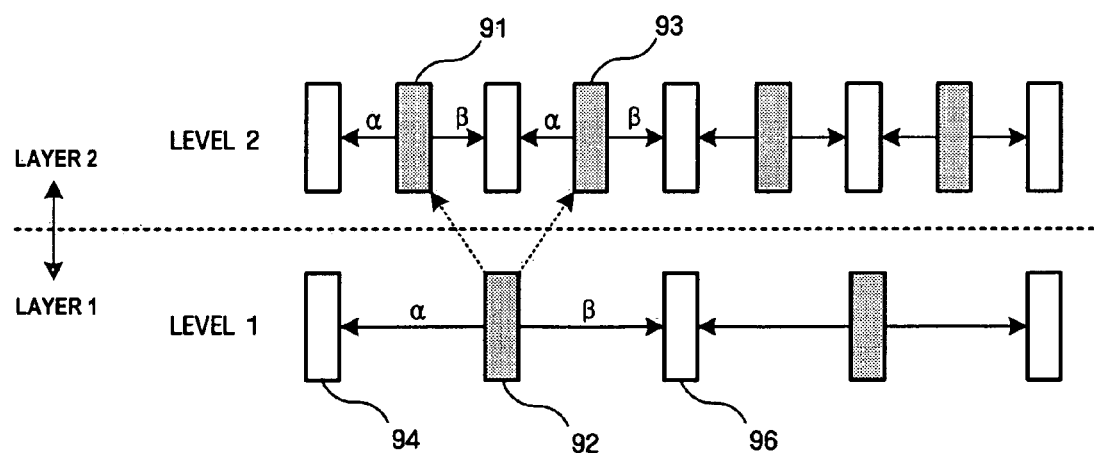
FIG. 9 illustrates an example in which an embodiment of the present invention is applied when a current picture is an asynchronized picture.

When the current picture is an asynchronized picture, a weighting factor can be calculated using a low layer picture at the closest temporal position to the current picture and its reference picture. When a high layer (Layer 2) has double the frame rate of a low layer (Layer 1) as shown in FIG. 9, pictures 91 and 93 in the high layer have corresponding base pictures and pictures in the high layer and low layer have different reference distances. However, weighting factors α and β for the pictures 91 and 93 can be calculated using a picture 92 in the low layer at the closest temporal position to the pictures 91 and 93 and its reference pictures 94 and 96.

For example, a "weighting factor calculation algorithm" is applied to a low layer picture 92 and the reference pictures 94 and 96 to calculate the weighting factors α and β that can be used as weighting factors for the pictures 91 and 93. As a result, a slight error may occur but does not significantly affect coding performance when brightness gradually increases or decreases like in a fade-in or fade-out sequence. For other sequences, this method exhibits high coding performance compared to the case where half the weighting factors α and β are applied. Hereinafter, a low layer picture at the same temporal position as or closest temporal position to a high layer picture is hereinafter generally referred to as a "base picture".

Figure 10:
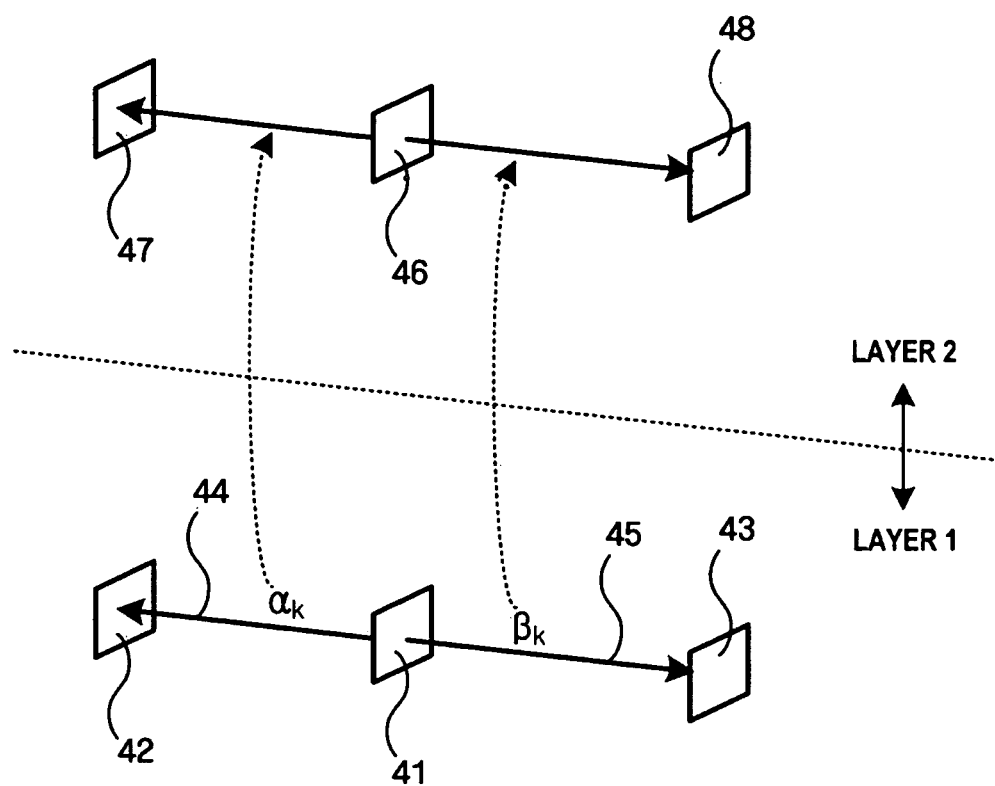
FIG. 10 is a schematic diagram for explaining a method for using a weighting factor calculated from a low layer for a high layer.

The "weighting factor calculation algorithm" will now be described. FIG. 10 is a schematic diagram for explaining a method for using a weighting factor calculated from a low layer for a high layer.

An operation occurring in a low layer will first be described referring to FIG. 10. That is, a unit block 41 means a region having a size ranging from a block size to a picture size. Thus, the unit block 41 may be a motion block, macroblock, slice, or picture. Of course, images 42 and 43 in a reference picture corresponding to the unit block 41 have the same size as the unit block 41. Motion vectors 44 and 45 from the unit block 41 mean motion vectors when the unit block 41 is a motion block. When the unit block 41 is a macroblock, slice, or picture, the motion vectors 44 and 45 mean a graphical representation of a plurality of motion vectors.

The weighting factor calculation algorithm consists of: (a) calculation of a weighted sum of reference pictures to the base picture using predetermined coefficients $\alpha_k$ and $\beta_k$; and (b) determination of values of the coefficients $\alpha_k$ and $\beta_k$ that minimizes the square of a difference between the base picture and the weighted sum. Here, $\alpha_k$ and $\beta_k$ denote forward and backward coefficients, respectively.

When a predicted block for the current unit block 41 is obtained using weighted prediction, i.e., a weighted sum of the reference images 42 and 43 in step (a), a weighted prediction value $P(s_k)$ for a pixel $s_k$ within the unit block 41 can be defined by Equation (1).

$$P(s_k) = \alpha_k * s_{k-1} + \beta_k * s_{k+1} \qquad (1)$$

where $s_{k-1}$ and $s_{k+1}$ respectively denote pixels within the images 42 and 43 corresponding to the pixel $s_k$.

An error $E_k$ that is the difference between the actual pixel $s_k$ and the prediction value $P(s_k)$ can be defined by Equation (2):

$$E_k = s_k - P(s_k) = s_k - \alpha_k * s_{k-1} - \beta_k * s_{k+1} \qquad (2)$$

Because $E_k$ is an error for a single pixel, the square of the sum of errors within the unit block 41 ($\Sigma E_k^2$) is defined by Equation (3):

$$\sum E_k^2 = \sum (s_k - \alpha_k * s_{k-1} - \beta_k * s_{k+1})^2 \qquad (3)$$

When $\Sigma E_k^2$ is partially differentiated with respect to $\alpha_k$ and the derivative is set equal to zero in order to obtain $\alpha_k$ that minimizes the $\Sigma E_k^2$, Equation (4) is obtained. In this case, $\beta_k$ is set to 0 so as not to consider the impact of $\beta_k$.

$$\frac{\partial \sum E_k^2}{\partial \alpha_k} = -2 * \sum (s_k * s_{k-1}) + 2\alpha_k \sum s_{k-1}^2 = 0 \qquad (4)$$

A first weighting factor $\alpha_k$ that minimizes $\Sigma E_k^2$ can be given by Equation (5):

$$\alpha_k = \frac{\sum s_k * s_{k-1}}{\sum s_{k-1}^2} \qquad (5)$$

When being calculated in the same manner as $\alpha_k$, a second weighting factor $\beta_k$ that minimizes the $\Sigma E_k^2$ can be given by Equation (6):

$$\beta_k = \frac{\sum s_k * s_{k+1}}{\sum s_{k+1}^2} \qquad (6)$$

The weighting factors $\alpha_k$ and $\beta_k$ for the unit block 41 in a low layer shown in FIG. 10 can be determined using the aforementioned algorithm. The weighting factors $\alpha_k$ and $\beta_k$ can be used as weighting factors for a block 46 in a high layer corresponding to the unit block 41. When the high layer has the same resolution as the low layer, the blocks 46 and 41 have the same size. When the high layer has higher resolution than the low layer, the block 46 may have a larger size than the block 41.

The high layer uses the weighting factors $\alpha_k$ and $\beta_k$ assigned to the low layer to calculate a weighted sum of reference images 47 and 48 instead of calculating new weighting factors, thus reducing overhead. The process of using the weighting factors assigned to the low layer as weighting factors for the high layer can be performed in the same way both in the encoder and the decoder.

Although the weighting factors $\alpha_k$ and $\beta_k$ are independently calculated using the above-mentioned process, these factors can be normalized on the assumption that $\alpha_k+\beta_k=1$. In other words, only one weighting factor $\alpha_k$ is used for a bi-directional reference scheme by using $1-\alpha_k$ instead of $\beta_k$. Substituting $1-\alpha_k$ into $\beta_k$ in the Equation (3) gives Equation (7):

$$\sum E_k^2 = \sum [(s_k + s_{k+1}) - (s_{k+1} - s_{k-1}) * \alpha_k]^2 \quad (7)$$

A weighting factor $\alpha_k$ that minimizes the $\Sigma E_k^2$ in the Equation (7) can be defined by Equation (8):

$$\alpha_k = \frac{\sum (s_{k+1} - s_{k-1})(s_{k+1} - s_k)}{\sum (s_{k+1} - s_{k-1})^2} \quad (8)$$

Using only one normalized weighting factor $\alpha_k$ reduces the amount of computations compared to using both the weighting factors $\alpha_k$ and $\beta_k$. A weighted sum is obtained by using $\alpha_k$ and $1-\alpha_k$ as weighting factors for the reference images 47 and 48, respectively.

Figure 11:
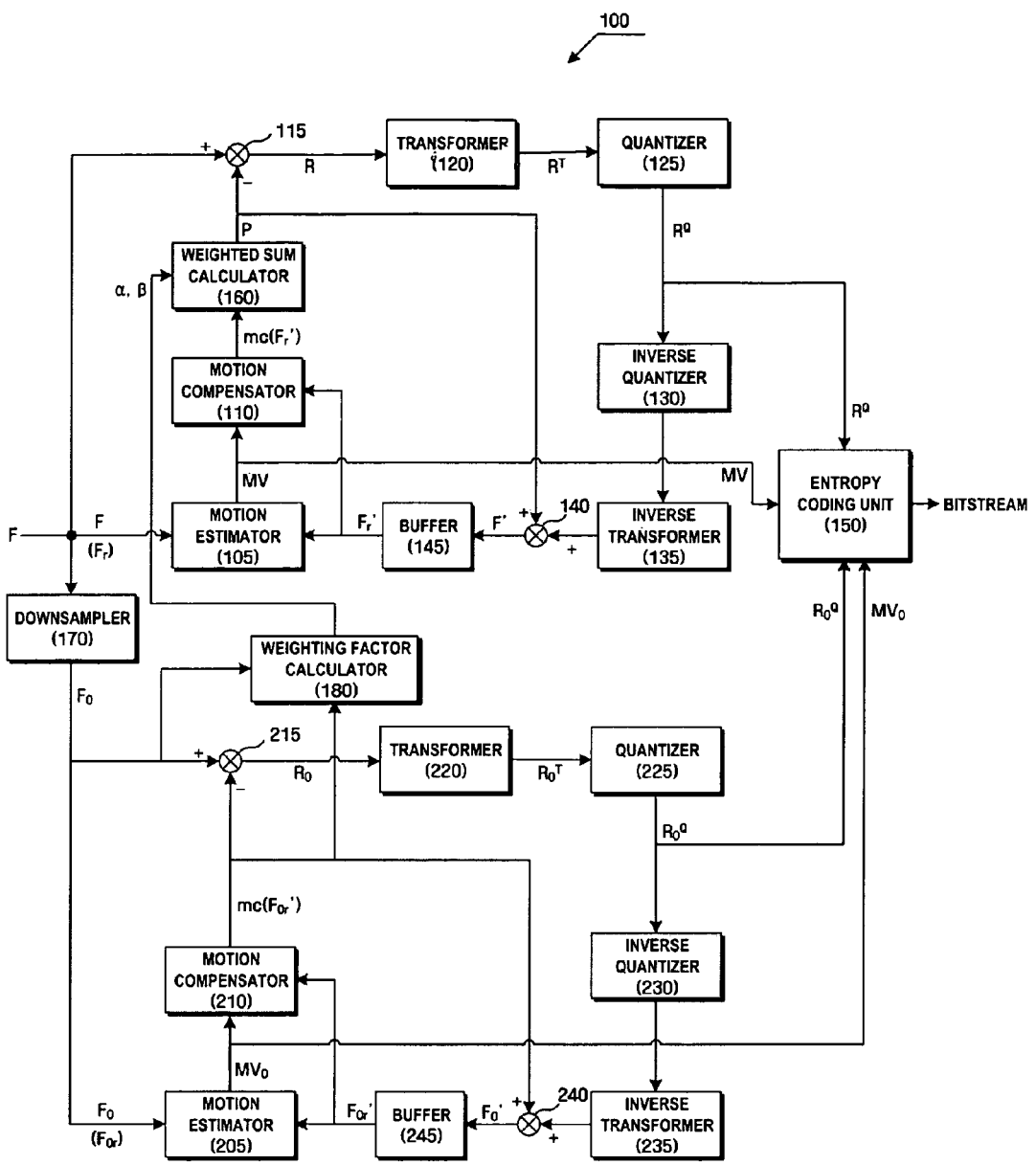
FIG. 11 is a block diagram of a video encoder according to an embodiment of the present invention.

FIG. 11 is a block diagram of a video encoder 100 according to an embodiment of the present invention. Referring to FIG. 11, an input current picture F is fed into a motion estimator 105, a subtractor 115, and a downsampler 170.

In a base layer, the video encoder 100 operates in the following manner.

The downsampler 170 temporally and spatially downsamples the current picture F.

A motion estimator 205 performs motion estimation on the downsampled picture $F_0$ using a neighboring reference picture to obtain a motion vector $MV_0$. An original image $F_{0r}$ may be used as the reference picture (open-loop coding) or a decoded image $F_{0r}'$ may be used as the reference picture (closed-loop coding). It is hereinafter assumed that both the high layer and low layer in the video encoder 100 support closed-loop coding. For motion estimation, a block matching algorithm is widely used. In other words, a block of a predetermined size in the present frame is compared with corresponding blocks, each being shifted by one pixel or sub-pixel (2/2 pixel, ¼ pixel, etc.) in a search block of a predetermined range, and the best-matched block having the smallest error is detected. For motion estimation, simple fixed block size motion estimation and hierarchical variable size block matching (HVSBM) may be used.

A motion compensator 210 uses the motion vector $MV_0$ to motion compensate for the reference picture $F_{0r}'$ to obtain a motion-compensated picture $mc(F_{0r}')$. When a plurality of reference pictures $F_{0r}'$ are used, motion compensation may be performed on each of the plurality of reference pictures $F_{0r}'$. The motion-compensated picture $mc(F_{0r}')$ or a predicted image calculated using the motion-compensated picture $mc(F_{0r}')$ are fed into a subtractor 215. When unidirectional reference is used, the motion-compensated picture $mc(F_{0r}')$ is input. When bidirectional reference is used, a predicted picture may be calculated by averaging a plurality of motion-compensated pictures $mc(F_{0r}')$ before being input to the subtractor 215. Because the present embodiment of the invention is not affected by whether weighted prediction is used for the low layer, FIG. 11 shows that no weighted prediction is applied to the low layer. Of course, weighted prediction may be applied to the low layer.

The subtractor 215 subtracts the estimated picture (or each motion-compensated block) from the downsampled picture $F_0$ and generates a difference signal $R_0$, which is then supplied to a transformer 220.

The transformer 220 performs a spatial transform on the difference signal $R_0$ and generates a transform coefficient $R_0^T$. The spatial transform method may include a Discrete Cosine Transform (DCT), or wavelet transform. Specifically, DCT coefficients may be created in a case where DCT is employed, and wavelet coefficients may be created in a case where wavelet transform is employed.

A quantizer 225 quantizes the transform coefficient. Quantization refers to a process of expressing the transform coefficient formed in an arbitrary real value by discrete values. For example, quantization is performed such that the transform coefficient is divided by a predetermined quantization step and the result is then rounded using an integer.

The quantization result supplied from the quantizer 225, that is, the quantization coefficient $R_0^Q$ is supplied to an entropy coding unit 150 and an inverse quantizer 230.

The inverse quantizer 230 inversely quantizes the quantization coefficient $R_0^Q$. The inverse quantization is performed in a reverse order to that of the quantization performed by the transformer 220 to restore values matched to indices generated during quantization according to a predetermined quantization step used in the quantization. Specifically, inverse DCT transform, or inverse wavelet transform may be used.

An inverse transformer 235 receives the inverse quantization result and performs an inverse transformation. The inverse transformation is performed in a reverse order to that of the transformation performed by the transformer 220. Specifically, inverse DCT transformation, or inverse wavelet transformation may be used. An adder 240 adds the inverse quantization result and the predicted picture (or motion-compensated picture) used in the motion compensation step performed by the motion compensator 210 and generates a restored picture $F_0'$.

A buffer 245 stores an addition result supplied from the adder 240. Thus, not only the currently restored picture $F_0'$ but also the previously stored reference picture $F_{0r}'$ are stored in the buffer 245.

In a high layer, the video encoder 100 operates in the following manner.

Like in the low layer, the video encoder 100 in the higher layer includes a motion estimator 105 calculating a motion vector MV, a motion compensator 110 that motion-compensates for a reference picture $F_r'$ using the motion vector MV, a subtractor 115 calculating a residual signal R between the current picture F and a predicted picture P, a transformer 120 applying transformation to the residual signal R to generate a transform coefficient $R^T$, a quantizer 125 quantizing the transform coefficient $R^T$ to output a quantization coefficient $R^Q$. The higher layer's video encoder further includes an inverse quantizer 130, an inverse transformer 135, an adder 140, and a buffer 145. Since functions and operations of these components are the same as those in the lower layer, their repetitive description will be omitted. The following description will focus on distinguishing features of the components.

A weighting factor calculator 180 uses a base picture $F_0$ in a low layer corresponding to a current picture in a high layer and motion-compensated reference picture mc ($F_{0r}'$) to calculate weighting factors $\alpha$ and $\beta$. The weighting factors $\alpha$ and $\beta$ can be calculated by the above Equations (5) and (6). A normalized weighting factor can be calculated by the Equation (8). Of course, when a unidirectional reference scheme is used, only one weighting factor may be used.

A weighted sum calculator 160 uses the calculated weighting factors $\alpha$ and $\beta$ (or the normalized weighting factor) to calculate a weighted sum of the motion-compensated pictures mc ($F_r$') provided by the motion compensator 110. For example, when $F_a$ and $F_b$ are the motion-compensated pictures and weighting factors for $F_a$ and $F_b$ are $\alpha$ and $\beta$, the weighted sum may be represented by $\alpha*F_a+\beta*F_b$. When only one motion-compensated picture $F_a$ and weighting factor $\alpha$ for the motion-compensated picture $F_a$ are used, the weighted sum is represented by $\alpha*F_a$.

Meanwhile, as described above, weighted prediction is performed per motion block, macroblock, slice, or picture. If the weighted prediction is performed in a smaller unit than a picture, a number of a pair of weighting factors $\alpha$ and $\beta$ corresponding to the number of units in the picture should be calculated and different weighting factors will be applied for each unit to calculate a weighted sum. The weighted sum, i.e., the predicted picture P, obtained by the weighted sum calculator 160 is fed into the subtractor 115.

The subtractor 115 generates the residual signal R by subtracting the predicted picture P from the current picture F and provides the same to the transformer 120. The transformer 120 applies spatial transform to the residual signal R to create the transform coefficient $R^T$. The quantizer 125 quantizes the transform coefficient $R^T$.

The entropy coding unit 150 performs lossless coding on the motion-estimated motion vectors MV and $MV_0$ provided from the motion estimators 105 and 205 and the quantization coefficients $R^Q$ and $R_0^Q$ provided from the quantizers 125 and 225, respectively. The lossless coding methods may include, for example, Huffman coding, arithmetic coding, and any other suitable lossless coding method known to one of ordinary skill in the art.

Figure 12:
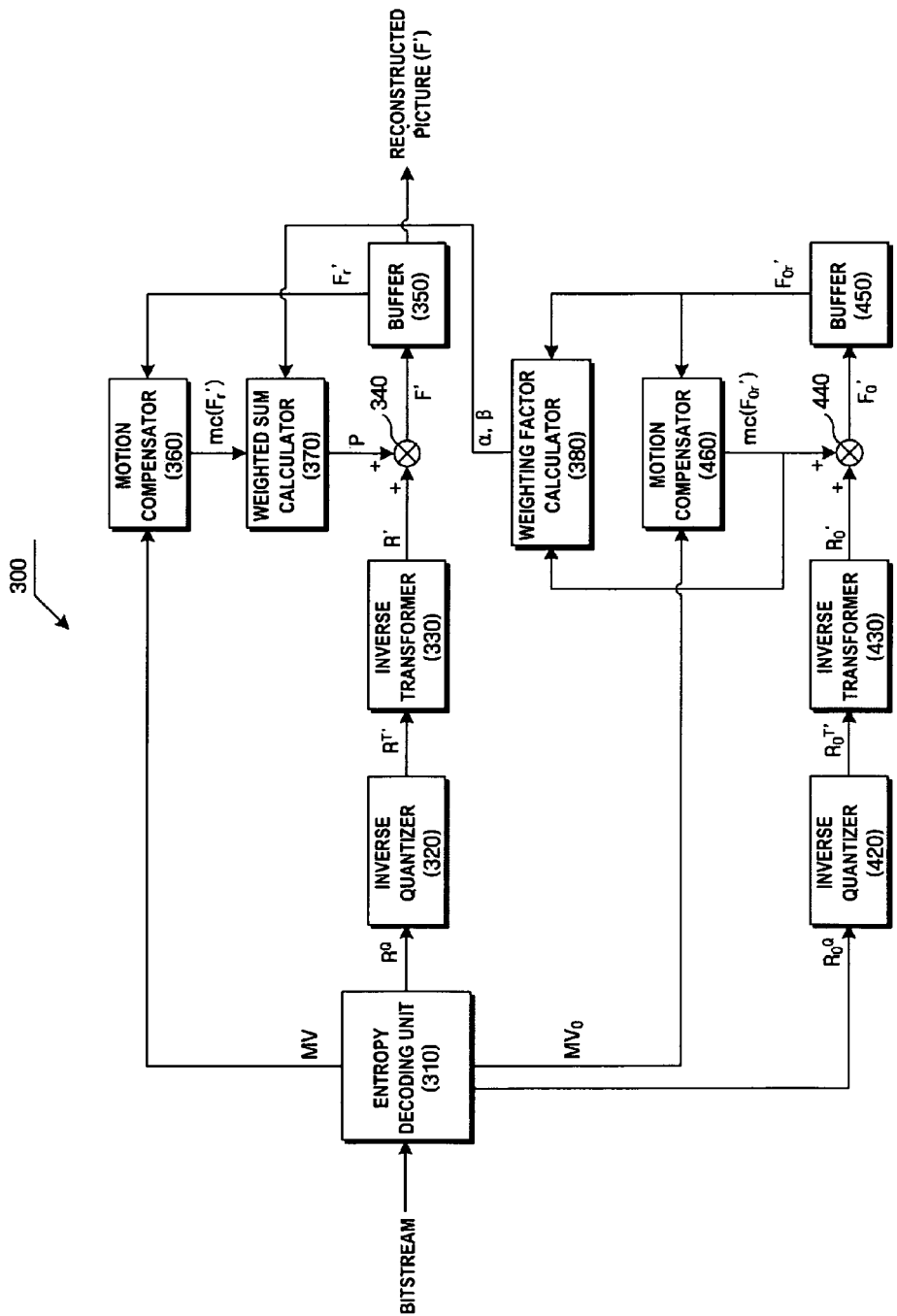
FIG. 12 is a block diagram of a video decoder according to an embodiment of the present invention.

FIG. 12 is a block diagram of a video decoder 300 according to an embodiment of the present invention.

An entropy decoding unit 310 performs lossless decoding on input bitstreams and extracts motion vectors Mv and $MV_0$ and texture data $R^Q$ and $R_0^Q$ for the respective layers. The lossless decoding is performed in a reverse order to that of lossless coding performed by an entropy coder part in each layer.

The extracted texture data $R_0^Q$ of the lower layer is provided to an inverse quantizer 420 and the extracted motion vector $MV_0$ of the lower layer is provided to a motion compensator 460. The extracted texture data $R^Q$ of the higher layer is provided to an inverse quantizer 320 and the extracted motion vector MV of the higher layer is provided to a motion compensator 360.

A decoding procedure performed in a lower layer will first be described.

The inverse quantizer 420 performs inverse quantization on the texture data $R_0^Q$. The inverse quantization is a process of restoring values matched to indices generated during the quantization process using the same quantization table as in the quantization process.

An inverse transformer 430 receives the inverse quantization result $R_0^{Ti}$ and performs an inverse transformation. The inverse transformation is performed in a reverse order to that of the transformation process performed by a transformer. Specifically, inverse DCT transformation, or inverse wavelet transformation may be used. As a result of the inverse transformation, the restored residual signal $R_0$' is provided to an adder 440.

A motion compensator 460 motion-compensates a low layer's reference picture $F_{0r}$', which is previously restored and stored in a buffer 450, using the extracted motion vector $MV_0$, and generates a motion-compensated picture mc($F_{0r}$').

In a high layer, the video decoder 300 operates in the following manner.

Like in the low layer, the video decoder 300 in the higher layer includes an inverse quantizer 320, an inverse transformer 330, a buffer 350, and a motion compensator 360. Since functions and operations of these components are the same as those in the lower layer, their repetitive description will be omitted. The following description will focus on distinguishing features of the components.

A weighting factor calculator 380 uses a base picture $F_0$ and a motion-compensated reference picture mc($F_{0r}$') to calculate weighting factors $\alpha$ and $\beta$. The weighting factors $\alpha$ and $\beta$ can be calculated by the Equations (5) and (6). A normalized weighting factor can be calculated by the Equation (8). Of course, when a unidirectional reference scheme is used, only one weighting factor may be used.

A weighted sum calculator 370 uses the calculated weighting factors $\alpha$ and $\beta$ (or the normalized weighting factor) to calculate a weighted sum of the motion-compensated pictures mc($F_r$') provided by the motion compensator 360. A weighted sum, i.e., a predicted picture P, obtained by the weighted sum calculator 370 is fed into an adder 340.

Like in the video encoder 100, weighted prediction is performed per motion block, macroblock, slice, or picture. If the weighted prediction is performed in a smaller unit than a picture, a number of a pair of weighting factors $\alpha$ and $\beta$ corresponding to the number of units in the picture should be calculated and different weighting factors will be applied for each unit to calculate a weighted sum.

The adder 340 adds the inverse transform result R' supplied from the inverse transformer 330 and the predicted picture and restores a current picture F'. A buffer 350 stores the restored current picture F'.

Figure 13:
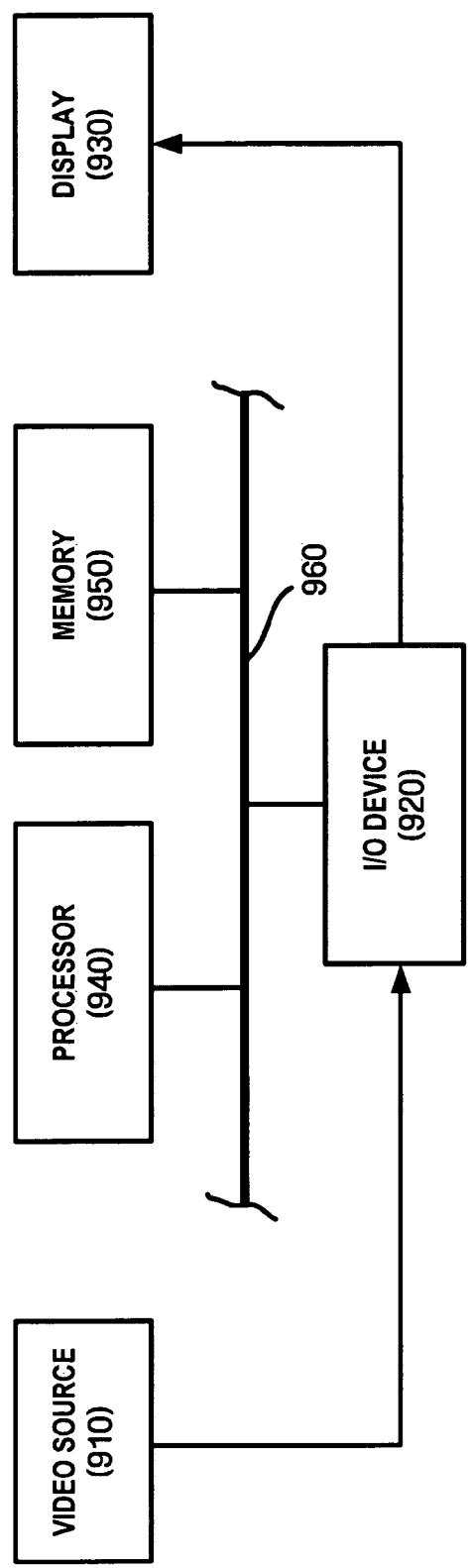
FIG. 13 is a schematic block diagram of a system in which a video encoder and/or a video decoder according to an exemplary embodiment of the present invention operate.

FIG. 13 is a schematic block diagram of a system in which the video encoder 100 and the video decoder 300 according to an exemplary embodiment of the present invention operate. The system may be a television (TV), a set-top box, a desktop, laptop, or palmtop computer, a personal digital assistant (PDA), or a video or image storing apparatus (e.g., a video cassette recorder (VCR) or a digital video recorder (DVR)). In addition, the system may be a combination of the above-mentioned apparatuses or one of the apparatuses which includes a part of another apparatus among them. The system includes at least one video/image source 910, at least one input/output unit 920, a processor 940, a memory 950, and a display unit 930.

The video/image source 910 may be a TV receiver, a VCR, or other video/image storing apparatus. The video/image source 910 may indicate at least one network connection for receiving a video or an image from a server using Internet, a wide area network (WAN), a local area network (LAN), a terrestrial broadcast system, a cable network, a satellite communication network, a wireless network, a telephone network, or the like. In addition, the video/image source 910 may be a combination of the networks or one network including a part of another network among the networks.

The input/output unit 920, the processor 940, and the memory 950 communicate with one another through a communication medium 960. The communication medium 960 may be a communication bus, a communication network, or at least one internal connection circuit. Input video/image data received from the video/image source 910 can be processed by the processor 940 using to at least one software program stored in the memory 950 and can be executed by the processor 940 to generate an output video/image provided to the display unit 930.

In particular, the software program stored in the memory 950 includes a scalable wavelet-based codec performing a method according to an embodiment of the present invention. The codec may be stored in the memory 950, may be read from a storage medium such as a compact disc-read only memory (CD-ROM) or a floppy disc, or may be downloaded from a predetermined server through a variety of networks.

As described above, a video encoder and video decoder according to embodiments of the present invention enable effective weighted prediction on a high layer picture by calculating weighting factors from a base picture without transmitting additional information to the decoder, thus providing for improved compression efficiency of video data.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for encoding video by performing weighted prediction on a current picture in a high layer using information concerning a picture in a low layer, the method comprising:

reading information concerning the picture in the low layer, including a weighting value used for predicting the picture in the low layer;

calculating at least one weighting factor for the current picture using the weighting value information for the picture in the low layer;

calculating a weighted sum of reference pictures to the current picture using the weighting factor, the reference pictures being in the high layer, and generating a predicted picture for the current picture using the weighted sum of the reference pictures in the high layer; and encoding a difference between the current picture and the predicted picture, wherein the reference pictures are different than the picture in the low layer, wherein the picture in the low layer is the picture having a closest temporal position to the current picture in the high layer, and wherein the picture in the low layer is not a picture having a same temporal position as the current picture in the high layer.

2. The method of claim 1, wherein the information concerning the picture the low layer contains a base picture corresponding to the current picture and reference pictures for the base picture.

3. The method of claim 2, wherein the reference pictures for the base picture are pictures motion-compensated by motion vectors from the base picture.

4. The method of claim 2, wherein the reading of the information, the calculating of the weighting factor, the calculating of the weighted sum of reference pictures, and the encoding of the difference are performed if the current picture has a same reference scheme and reference distance as the base picture.

5. The method of claim 2, wherein the calculating of the weighting factor comprises:

calculating a weighted sum of reference pictures for the base picture using predetermined coefficients; and calculating values of the coefficients minimizing the square of a difference between the base picture and the weighted sum.

6. The method of claim 4, wherein the coefficients include forward and backward coefficients.

7. The method of claim 6, wherein a sum of the forward and backward coefficients is 1.

8. The method of claim 1, wherein the calculating of the weighting factor and the calculating of the weighted sum of reference pictures are performed in units of one of a picture, a slice, a macroblock, and a motion block.

9. The method of claim 1, wherein the calculating of the weighted sum of reference pictures comprises:

if only one reference picture exists for the current picture, calculating a product of the weighting factor and the reference picture for the current picture; and if a plurality of reference pictures exist for the current picture, multiplying appropriate weighting factors by the plurality of reference pictures, respectively, and adding the products together.

10. A method for decoding video contained in an input bitstream by performing weighted prediction on a current picture in a high layer using information about a picture in a low layer, the method comprising:

extracting texture data and motion data from the input bitstream;

reconstructing information about the picture in the low layer from the texture data, including a weighting value used for predicting the picture in the low layer;

calculating at least one weighting factor for the current picture using the weighting value information for the picture in the low layer;

calculating a weighted sum of reference pictures to the current picture using the weighting factor, the reference pictures being in the high layer, and generating a predicted picture for the current picture using the weighted sum of the reference pictures in the high layer; and reconstructing a residual signal for the current picture from the texture data and adding the reconstructed residual signal to the predicted picture, wherein the reference pictures are different than the picture in the low layer, wherein the picture in the low layer is the picture having a closest temporal position to the current picture in the high layer, and wherein the picture in the low layer is not a picture having a same temporal position as the current picture in the high layer.

11. The method of claim 10, wherein the information concerning the picture in the low layer contains a base picture corresponding to the current picture and reference pictures for the base picture.

12. The method of claim 11, wherein the reference pictures for the base picture are pictures motion-compensated by motion vectors from the base picture.

13. The method of claim 11, wherein the extracting of the texture data and motion data, the reconstructing of the information about the picture in the low layer, the calculating of the weighting factor, the calculating of the weighted sum of reference pictures, and the reconstructing of the residual signal are performed if the current picture has a same reference scheme and reference distance as the base picture.

14. The method of claim 11, wherein the calculating of the weighting factor and the calculating of the weighted sum of reference pictures are performed in units of one of a picture, a slice, a macroblock, and a motion block.

15. The method of claim 10, wherein the calculating of the weighted sum of reference pictures comprises:
if one reference picture exists for the current picture, calculating a product of the weighting factor and the reference picture for the current picture; and
if a plurality of reference pictures exist for the current picture, multiplying appropriate weighting factors by the plurality of reference pictures, respectively, and adding the products together.

16. A non-transitory computer readable medium having stored therein a program for making a computer execute operations of a video encoder for performing weighted prediction on a current picture in a high layer using information concerning a picture in a low layer, said program including computer executable instructions for:
an element for reading information concerning the picture in the low layer, including a weighting value used for predicting the picture in the low layer;
an element for calculating at least one weighting factor for the current picture using the weighting value information for the picture in the low layer;
an element for calculating a weighted sum of reference pictures for the current picture using the weighting factor, the reference pictures being in the high layer, and generating a predicted picture for the current picture using the weighted sum of the reference pictures in the high layer; and
an element for encoding a difference between the current picture and the predicted picture,
wherein the reference pictures are different than the picture in the low layer,
wherein the picture in the low layer is the picture having a closest temporal position to the current picture in the high layer, and
wherein the picture in the low layer is not a picture having a same temporal position as the current picture in the high layer.

17. A non-transitory computer readable medium having stored therein a program for making a computer execute operations of a video decoder for performing weighted prediction on a current picture in a high layer using information concerning a picture in a low layer, said program including computer executable instructions for:
an element for extracting texture data and motion data from an input bitstream;
an element for reconstructing information about the picture in the low layer from the texture data, including a weighting value used for predicting the picture in the low layer;
an element for calculating at least one weighting factor the current picture using the weighting value information for the picture in the low layer;
an element for generating a predicted picture for the current picture by calculating a weighted sum of reference pictures for the current picture using the weighting factors, the reference pictures being in the high layer; and
an element for adding texture data of the current picture among the texture data to the predicted picture,
wherein the reference pictures are different than the picture in the low layer,
wherein the picture in the low layer is the picture having a closest temporal position to the current picture in the high layer, and
wherein the picture in the low layer is not a picture having a same temporal position as the current picture in the high layer.

18. A method for decoding video contained in an input bitstream by performing weighted prediction on a current picture in a high layer using information about a picture in a low layer, the method comprising:
extracting texture data and motion data from the input bitstream;
reconstructing information about the low layer picture from the texture data;
calculating weighting factors using the information about the low layer picture;
calculating a weighted sum of reference pictures to the current picture using the weighting factors and generating a predicted picture for the current picture; and
reconstructing a residual signal for the current picture from the texture data and adding the reconstructed residual signal to the predicted picture,
wherein the information concerning the low layer picture contains a base picture corresponding to the current picture and reference pictures for the base picture, and
wherein the calculating of the weighting factors comprises:
calculating a weighted sum of reference pictures for the base picture using predetermined coefficients; and
calculating the values of the coefficients that minimize the square of a difference between the base picture and the weighted sum.

19. The method of claim 18, wherein the coefficients include forward and backward coefficients.

20. The method of claim 19, wherein a sum of the forward and backward coefficients is 1.

* * * * *